United States Patent Office 3,249,595
Patented May 3, 1966

3,249,595
AQUEOUS EMULSION POLYMERIZATION PROCESS EMPLOYING WATER-SOLUBLE PEROXIDES
Michael Lederer and Horst Pfister, both of Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 23, 1962, Ser. No. 189,296
Claims priority, application Germany, Apr. 26, 1961, F 33,757
11 Claims. (Cl. 260—85.5)

The present invention relates to a process for polymerizing unsaturated compounds in aqueous phase in the presence of novel, water-soluble peroxidic compounds as free-radical-liberating catalysts.

It is known to use water-soluble peroxides, for example $H_2O_2$, potassium persulfate, sodium persulfate or ammonium persulfate, in the emulsion polymerization of vinyl compounds. In practice the said catalysts are added in an amount of 0.1 to 0.5 percent, calculated on the monomer. Operating with catalysts of this kind involves, however, some disadvantages. For example the thermostability of polymers obtained with such catalysts is often unsatisfactory.

It has now been found that polymerizable unsaturated compounds can be polymerized in aqueous phase in the presence or absence of dispersing agents by using as catalysts peroxides of the general formula

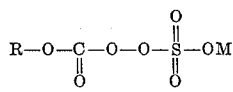

wherein R stands for an alkyl, aryl, cycloalkyl, aralkyl, alkylaryl or heterocyclic radical which may be substituted and M is an equivalent of a metal of main groups I and II of the periodic table of Mendeleeff, preferably an alkali metal, or the radical $NH_4$.

The aliphatic radical can be saturated or unsaturated and contains preferably 1 to 20 carbon atoms in a straight or branched chain. There are mentioned by way of example the methyl, ethyl, propyl, isopropyl, butyl, isobutyl, tertiary butyl, amyl or allyl radical, which may be substituted. Substituted aliphatic radicals are, for example, radicals which carry a carbalkoxy group.

Suitable alicyclic and heterocyclic radicals are, for example, the cyclopentyl, cyclohexyl or tetrahydrofurfuryl radical.

As aromatic radicals there are recited, for example, the phenyl, tolyl, xylyl, benzyl and tertiary butylphenyl radical.

The peroxides to be used in accordance with the invention are very effective as catalyst in the polymerization of unsaturated compounds in aqueous phase. The polymers produced with these catalysts are more stable towards the action of heat than polymers made with the usual catalysts. In the case of halogen-containing polymers the higher stability involves a better resistance to coloration on drying and processing at higher temperatures.

The peroxides to be used in the process of the invention can be obtained by reacting esters of holoformic acids preferably chloroformic acid, with inorganic peracids, advantageously sulfomonoper-acid, in the presence of bases, e.g., as described in application Serial No. 189,295 filed concurrently herewith. Especially suitable are the potassium salts.

The activity of the novel peroxidic compounds in the polymerization can be improved by known methods by combining them with reducing agents or with heavy metal ions as a kind of redox system.

Suitable reducing agents are, for example, $Na_2SO_3$, $NaHSO_3$, sodium sulfoxylate, sodium chlorite. As heavy metal ions there can be used, for example, the ions of iron, cobalt, copper or silver. These components are used in an amount in the range of 0.001 to 0.5% by weight, calculated on the peroxide used.

The novel peroxides can be used as catalysts for the polymerization of compounds containing one or several olefinic double bonds. There are mentioned by way of example the following compounds and classes of compounds: monoolefins such as ethylene, propylene, butylene, styrene; diolefins such as butadiene, methylbutadiene, chloroprene; acryl derivatives such as acrylic acid, acrylic esters, acryl amide, methacrylic acid esters, acrylonitrile; vinyl esters such as vinyl acetate, vinylpropionate, vinylphosphonic acid and the esters thereof; halogen-containing vinyl compounds such as vinyl chloride, vinyl fluoride, trifluorochlorethylene, tetrafluorethylene, 1,1-difluoro-2,2-dichlorethylene; vinylidene compounds such as vinylidene chloride, vinylidene cyanide, vinylidene fluoride; vinyl ketones; esters of unsaturated mono-, di-, and poly-carboxylic acids; N-vinyl compounds and acrolein.

The process of the present invention is not limited to the homopolymerization of the monomers mentioned above. It can likewise be used for polymerizing mixtures of said monomers with one another, whereby valuable copolymers are obtained.

The unsaturated compounds are polymerized in aqueous phase in the presence or absence of dispersing agents. Suitable dispersing agents are anionic, cationic as well as non-ionic emulsifiers, for example the alkali metal salts of alkyl sulfates or sulfonates having 6 to 30 carbon atoms, tertiary ammonium salts, glycerol esters of carboxylic acids having a long chain, and substances of high molecular weight such as polyvinyl alcohol, gelatin, or methylcellulose. Still further, there may be used finely distributed. Solid suspension stabilizers as dispersing agents. The dispersing agents can also be used in combination with one another. They are used in an amount of from about 0.1 to 10% by weight, preferably of 1–5% by weight, calculated on the monomer.

The process of the invention is suitably carried out in aqueous emulsion with the use of an ionic emulsifier. 0.001 to 1% and preferably 0.01 to 0.5% of the catalyst, calculated on the monomer, is dissolved in the aqueous phase which contains in the dissolved state a known dispersing agent, for example an alkylsulfonate, and the monomer is added with the exclusion of oxygen. The aqueous phase may likewise contain buffer substances, for example, $NaHCO_3$.

The process can be carried out continuously or discontinuously. When operating in discontinuous manner the total amount of the monomer may be added at the beginning of the polymerization. Alternatively, one part of the monomer can be introduced first into the reaction vessel and the remainder can be added continuously in the course of the polymerization.

The polymerization is carried out at a temperature in the range of −20° C. to +120° C., preferably +20° C. to +80° C., either at atmospheric pressure or under a pressure of up to several hundred atmospheres, depending on the monomer to be polymerized.

It has been found that in the polymerization of certain monomers the space-time yield depends on the pH value of the aqueous phase of the polymerization batch. It is, therefore, recommended to polymerize these monomers, for example styrene, in the acid range.

The following Examples serve to illustrate the present invention but they are not intended to limit it thereto, the parts being by weight unless otherwise stated.

Example 1

A stirring autoclave was charged with 225 parts of water, 3 parts of alkylsulfonate (a $C_{10}$–$C_{16}$ sulfonate obtained by sulfochlorination and alkaline hydrolysis of Fischer-Tropsch paraffins), 0.05 part of an alkylnaphthalensulfonate (sodium isobutylnaphthalenesulfonate) and 0.1 part of catalyst. The catalyst was a potassium compound of the formula recited in column 1 in which R was the cyclohexyl group. After having removed the air from the reaction vessel, 100 parts of vinyl chloride were introduced and the batch was polymerized at 52° C. After 200 minutes the pressure had dropped from 7.3 atmospheres gage to 3.0 atmospheres gage. 94 parts of polymer were obtained in the form of a stable emulsion. The polymer was precipitated with isopropanol. After drying at 50° C. a colorless polymer was obtained.

*Comparison.*—Vinyl chloride was polymerized as described above. As catalyst there was used 0.1 part of a compound of the formula

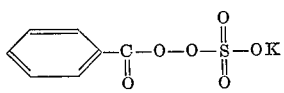

After 200 minutes a conversion of only 22.9% was obtained.

Vinyl chloride was polymerized as described above with 0.1 part of $K_2S_2O_8$ as catalyst. After 200 minutes the conversion amounted to only 64%. After drying at 50° C. the precipitated polymer had a pink color due to incipient decomposition.

Example 2

Vinyl chloride was polymerized as described in Example 1 while using as catalyst 3.1 parts of the cyclohexyl compound mentioned in non-purified form, which still contained inert inorganic salts and had a strength of only 19%, calculated on the active oxygen. The amount of catalyst used corresponded to 0.06 part of pure compound. After 200 minutes 68 parts of polymer were obtained in the form of a stable emulsion.

*Comparison.*—Vinyl chloride was polymerized as described in Example 1. As catalyst 0.06 part of $K_2S_2O_8$ was used. After 200 minutes 33 parts of polymer were obtained in the form of an emulsion.

Examples 3–6

The following examples illustrate the activation of a catalyst according to the invention (in which R stands for cyclohexyl and M is potassium) with reducing agents or heavy metal ions.

Vinyl chloride was polymerized as described in Example 1 with 0.1 part of catalyst. In the course of the polymerization a dilute solution of the additives was supplied. The results obtained are listed in the following table.

| Example | Polymerization temperature, ° C. | Additive | Polymerization period, minutes | Conversion, percent |
|---|---|---|---|---|
| 3 | 40 | | 660 | 97 |
| 4 | 40 | 0.025% $NaHSO_3$ | 260 | 98 |
| 5 | 30 | 0.016% sodium-formaldehyde/sulfoxylate. | 150 | 99 |
| 6 | 40 | 0.001% $AgNO_3$ | 510 | 93.2 |

Example 7

In a stirring autocalve 90 parts of vinyl chloride and 10 parts of 1,1-difluoro-2,2-dichlorethylene were emulsified in 225 parts of water containing 3 parts of an alkylsulfonate (a $C_{10}$–$C_{16}$ sulfonate obtained by sulfochlorination and alkaline hydrolysis of Fischer-Tropsch paraffins) and the emulsion was polymerized at 50° C. in the presence of 0.1 part of a compound having the formula recited on page 1 in which R is the cyclohexyl group and M is potassium. After 330 minutes 97.4 parts of a copolymer were obtained in the form of a stable emulsion. When the catalyst of the invention was replaced by the same amount of potassium persulfate, the conversion amounted to 97.3% after 580 minutes only.

Example 8

A glass flask provided with stirrer and nitrogen purging device was charged with 200 parts of water, 3 parts of alkylsulfonate (a $C_{10}$–$C_{16}$ sulfonate obtained by sulfochlorination and alkaline hydrolysis of Fischer-Tropsch paraffins), 0.55 part of an alkylnaphthalene sulfonate (sodium isobutylnaphthalenesulfonate) and 0.1 part of catalyst. The catalyst used was the reaction product of the cyclohexyl ester of chloroformic acid and the potassium salt of sulfomonoperacid. After the addition of 100 parts of styrene the reaction vessel was heated to 50° C. and the batch was polymerized for 2 hours at said temperature. A stable emulsion was obtained. The polymer was precipitated with isopropanol and dried at 50° C. 64 parts of a colorless polymer were obtained.

Example 9

The polymerization was carried out described in Example 8. As monomer there was used a mixture of 70 parts of acrylonitrile and 30 parts of acrylic acid 2-ethylhexyl ester. After having polymerized for 90 minutes at 50° C. the polymer was precipitated in the emulsion with a saturated sodium chloride solution. 83 parts of copolymer were obtained.

Example 10

A mixture of 50 parts of vinyl acetate and 50 parts of acrylic acid butyl ester was polymerized as described in Example 8 for 3 hours at 50° C. The copolymer was precipitated in the emulsion with methanol. 64 parts of a colorless copolymer were obtained.

Example 11

A mixture of 80 parts of styrene and 20 parts of acrylonitrile was polymerized as described in Example 8 for 2 hours at 50° C. By precipitation with methanol 80 parts of a colorless copolymer were isolated from the emulsion obtained.

We claim:
1. In a process for the aqueous emulsion polymerization of ethylenically unsaturated compounds, the improvement of polymerizing said compounds at a temperature of from —20° C. to 120° C. in the presence of a peroxide catalyst of the general formula

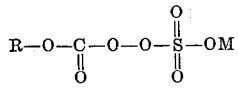

in which R is a member selected from the group consisting of saturated and ethylenically unsaturated acyclic aliphatic hydrocarbon radicals having from 1–20 carbon atoms, phenyl, phenylalkyl, alkylphenyl, cyclopentyl, cyclohexyl, and the tetrahydrofurfuryl radical, and M is an alkaline metal or alkaline earth metal.

2. A process as claimed in claim 1, wherein the catalyst is used in an amount of 0.001 to 1.0 and preferably 0.01 to 0.5% by weight, calculated on the monomer.

3. A process as claimed in claim 1, wherein the catalyst used in a peroxide of the formula defined in claim 1 in which R stands for the cyclohexyl radical and M is potassium.

4. A process as claimed in claim 1, wherein the polymerization is carried out in the presence of an ionic emulsifier.

5. A process as claimed in claim 1, wherein the polymerization is carried out in the presence of at least one member selected from the group consisting of a reducing agent and a heavy metal ion selected from the group consisting of iron, cobalt, copper, and silver ions.

6. The process defined in claim 1, wherein the ethylenically unsaturated compound is vinyl chloride.

7. The process as defined in claim 1, wherein the ethylenically unsaturated compound is styrene.

8. The process defined in claim 1, wherein the ethylenically unsaturated compounds are vinyl acetate and a lower alkyl acrylate.

9. The process defined in claim 1, wherein the ethylenically unsaturated compounds are acrylonitrile and styrene.

10. The process defined in claim 1, wherein the ethylenically unsaturated compounds are vinyl chloride and difluorodichloroethylene.

11. The process defined in claim 1, wherein the catalyst is

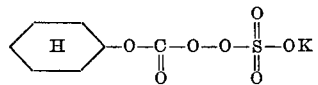

References Cited by the Examiner

FOREIGN PATENTS 1,011,623  7/1957  Germany.

OTHER REFERENCES

Schildknecht: Polymer Process, pp. 84–85 and 143–144, Interscience (1956).

JOSEPH L. SCHOFER, *Primary Examiner.*

WILLIAM H. SHORT, JAMES A. SEIDLECK,
*Examiners.*